(12) United States Patent
Machi et al.

(10) Patent No.: US 7,278,766 B2
(45) Date of Patent: Oct. 9, 2007

(54) LED BASED LIGHT GUIDE FOR DUAL MODE AIRCRAFT FORMATION LIGHTING

(75) Inventors: Nicolo F. Machi, Marysville, OH (US); Scott R. Mangum, Dublin, OH (US); Jeffrey M. Singer, Fairborn, OH (US); Joseph L. Ferguson, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 106 days.

(21) Appl. No.: 10/740,658

(22) Filed: Dec. 18, 2003

(65) Prior Publication Data

US 2004/0196646 A1  Oct. 7, 2004

Related U.S. Application Data

(60) Provisional application No. 60/460,376, filed on Apr. 4, 2003.

(51) Int. Cl.
*B64D 47/02* (2006.01)

(52) U.S. Cl. .............. 362/470; 362/606; 362/612; 362/626; 340/945; 340/961; 340/982; 340/815.45; 340/815.5

(58) Field of Classification Search ............ 362/606, 362/612, 625, 626, 607, 470; 340/945, 959, 340/961, 981, 982, 815.42–815.43, 815.45, 340/815.5, 518.73–518.76
See application file for complete search history.

(56) References Cited

U.S. PATENT DOCUMENTS

| | | | |
|---|---|---|---|
| 4,104,555 A * | 8/1978 | Fleming | 313/512 |
| 5,014,167 A | 5/1991 | Roberts | |
| 5,070,431 A | 12/1991 | Kitazawa et al. | |
| 5,485,291 A | 1/1996 | Qiao et al. | |
| 5,779,338 A | 7/1998 | Ishikawa et al. | |
| 5,984,494 A * | 11/1999 | Chapman et al. | 362/470 |
| 6,007,209 A | 12/1999 | Pelka | |
| 6,132,072 A * | 10/2000 | Turnbull et al. | 362/494 |
| 6,134,092 A | 10/2000 | Pelka et al. | |
| 6,142,647 A | 11/2000 | Hayakawa | |
| 6,231,200 B1 * | 5/2001 | Shinohara et al. | 362/619 |
| 6,244,728 B1 | 6/2001 | Cote et al. | |
| 6,259,854 B1 | 7/2001 | Shinji et al. | |
| 6,268,702 B1 * | 7/2001 | Fleck | 315/185 R |
| 6,290,364 B1 * | 9/2001 | Koike et al. | 362/620 |
| 6,350,039 B1 | 2/2002 | Lee | |

(Continued)

FOREIGN PATENT DOCUMENTS

EP  0 323 217  7/1989

(Continued)

*Primary Examiner*—Jong-Suk (James) Lee
*Assistant Examiner*—Jacob Y Choi
(74) *Attorney, Agent, or Firm*—Birch, Stewart, Kolasch & Birch, LLP

(57) ABSTRACT

A lighting device (1) includes one or more diode light sources (32), which are configured to emit light into the peripheral edges of a light guide (20). The light guide (20) includes a set of diffusing elements (22) for scattering the emitted light in a plurality of directions out of the front surface of the light guide (20). The diffusing elements (22) are distributed on the light guide (20) so that the scattered light achieves a particular characteristic, e.g., improved uniformity.

26 Claims, 7 Drawing Sheets

U.S. PATENT DOCUMENTS

| | | | |
|---|---|---|---|
| 6,461,029 B2 * | 10/2002 | Gronemeier et al. | 362/545 |
| 6,568,833 B2 * | 5/2003 | Worgan et al. | 362/470 |
| 6,582,091 B2 * | 6/2003 | Funamoto et al. | 362/601 |
| 6,614,179 B1 * | 9/2003 | Shimizu et al. | 313/512 |
| 6,672,734 B2 * | 1/2004 | Lammers | 362/612 |
| 6,697,042 B1 * | 2/2004 | Cohen et al. | 345/102 |
| 6,786,618 B2 * | 9/2004 | Schulz et al. | 362/247 |
| 6,840,646 B2 * | 1/2005 | Cornelissen et al. | 362/606 |
| 6,846,099 B2 * | 1/2005 | Dubin et al. | 362/470 |
| 6,926,432 B2 * | 8/2005 | Rodriguez Barros et al. | 362/494 |
| 7,040,794 B2 * | 5/2006 | Bernard | 362/555 |
| 7,048,428 B2 * | 5/2006 | Tahara et al. | 362/626 |
| 7,055,994 B2 * | 6/2006 | Martin | 362/470 |
| 2003/0012035 A1 | 1/2003 | Bernard | |
| 2003/0218874 A1 * | 11/2003 | Fujino et al. | 362/31 |
| 2003/0219207 A1 * | 11/2003 | Guy | 385/49 |

FOREIGN PATENT DOCUMENTS

| | | |
|---|---|---|
| EP | 0 544 332 | 6/1993 |
| EP | 0 962 694 | 12/1999 |

* cited by examiner

LED BASED LIGHT GUIDE FOR DUAL MODE AIRCRAFT FORMATION LIGHTING

CROSS REFERENCE TO RELATED APPLICATIONS

This nonprovisional application claims the benefit under 35 U.S.C. § 119 of U.S. Provisional Patent Application No. 60/460,376 filed on Apr. 4, 2003, the entirety of which is hereby incorporated by reference.

FIELD OF THE INVENTION

The present invention is directed to aircraft lighting, and more particularly, to aircraft formation lights utilizing light emitting diodes (LEDs).

BACKGROUND OF THE INVENTION

Formation lights are mounted on the exterior of an aircraft to enhance the aircraft's visibility to other aircraft flying in close proximity. For example, many types of military aircraft utilize formation lights to provide aircraft recognition and spatial orientation during formation flight activities.

Existing aircraft formation lights employ electroluminescent lamp (EL) technology, usually in the form of an electroluminescent strip. However, such conventional formation lights suffer from disadvantages relating to degradation that occurs over time. Generally, the luminescence decreases rapidly, usually decreasing by a factor of 2 within only a few hundred hours of operation. Accordingly, formation lights utilizing EL technology quickly become hard to recognize by other pilots. This results in a potentially dangerous situation when aircraft are flying in close proximity during low visibility conditions, such as nighttime.

The shape and size of formation lights must conform to various requirements. Among these constraints is that the formation lights must be relatively thin. Generally, the thickness of the formation lights used on the exterior of aircraft is less than a ½ inch (1.27 cm).

Thus, it would be advantageous to provide a formation light that exhibits less degradation over time, while maintaining the same package thickness and light uniformity as existing EL technology. Furthermore, a diode light source formation light may be much brighter than traditional EL technology.

SUMMARY OF THE INVENTION

Exemplary embodiments of the present invention are directed to a lighting device that utilizes a diode light source, while maintaining a package thickness and light uniformity suitable for an aircraft formation light. The device may use, for example, one or more light emitting diodes (LEDs) as light sources.

According to an exemplary embodiment, the lighting device includes a light guide having a set of diffusing elements, and one or more diode light sources configured so as to emit light into one or more peripheral edges of the light guide. The diffusing elements are operable to scatter the light from the diode light sources in such a manner that the scattered light exits a front surface of the light guide in a plurality of directions. In an exemplary embodiment, the light guide is located in front of a reflective base. Thus, light emanating from the diode light sources to the rear surface of the light guide may be reflected into a "visible" direction, i.e., toward the front surface.

The diffusing element may be distributed over a rear surface of the light guide in order to achieve certain visual characteristics. For example, the distribution of diffusing elements may be designed so that the output light is uniformly bright along the lighting device. Also, the diffusing elements may allow the output light to seem uniformly bright when viewed from each of a plurality of directions.

Accordingly, various aspects of the diffusing elements, such as their shape, size and relative spacing, may be designed to achieve the desired visual characteristic. According to an exemplary embodiment, the configuration of the diffusing elements may be designed based on a computer simulation.

In an exemplary embodiment, the light guide may be formed of a transparent plastic material (such as acrylic), and the diffusing elements make comprise etchings on the rear surface of the plastic light guide. For example, the diffusing elements may be laser etched on the rear surface of the light guide.

In an alternative exemplary embodiment, the diffusing elements may be incorporated in an external coating of the rear surface of the light guide, e.g., painted or printed on the rear surface.

In an exemplary embodiment of the present invention, the diode light sources may include light emitting diodes (LEDs) for emitting visible light. In another exemplary embodiment, the diode light sources may include infrared (IR) diodes for emitting infrared light.

According to one exemplary embodiment, the lighting device may be configured as a dual mode device including both LEDs and IR diodes as its diode light sources. In such an embodiment, the lighting device may selectively operate in a visible mode for outputting visible light, and in an infrared mode for outputting infrared light. This dual mode configuration may allow the lighting device to be used as a formation light on military aircraft, which emits aviation green light during normal flight and IR light during covert operations.

The lighting device according to exemplary embodiments may further include a diffuse transmissive layer configured to redirect the light scattered by the diffusing elements of the light guide. The diffused transmissive layer may be designed to improve the visual characteristics (e.g., uniformity) of the light. For example, the diffused transmissive layer may be implemented in an outer lens of the lighting device or as a sheet between the light guide and the outer lens.

In an exemplary embodiment, the lighting device may be implemented, as a formation light on an aircraft. Accordingly, an accumulative thickness of the device, including the light guide, may be less than, or substantially equal to, ½ of an inch (1.27 cm).

Further scope and applicability of the present invention will become apparent from the detailed description provided below. However, it should be understood that the detailed description and specific embodiments therein, while disclosing preferred embodiments of the invention, are provided for purposes of illustration only. Those skilled in the art will appreciate that various changes and modifications are within the spirit and scope of the invention and will become apparent from the detailed description that follows.

BRIEF DESCRIPTION OF THE DRAWINGS

A more complete understanding of the present invention will become apparent from the following description taken in conjunction with the accompanying drawings, wherein:

FIG. 4A illustrates various locations on an aircraft where the lighting device of the present invention may be mounted for use as an aircraft formation light, while

DETAILED DESCRIPTION OF EXEMPLARY EMBODIMENTS

Exemplary embodiments of the present invention are directed to a lighting device that utilizes a diode light source, and is suitable for use as a formation light on the exterior of an aircraft.

Figure 1A:
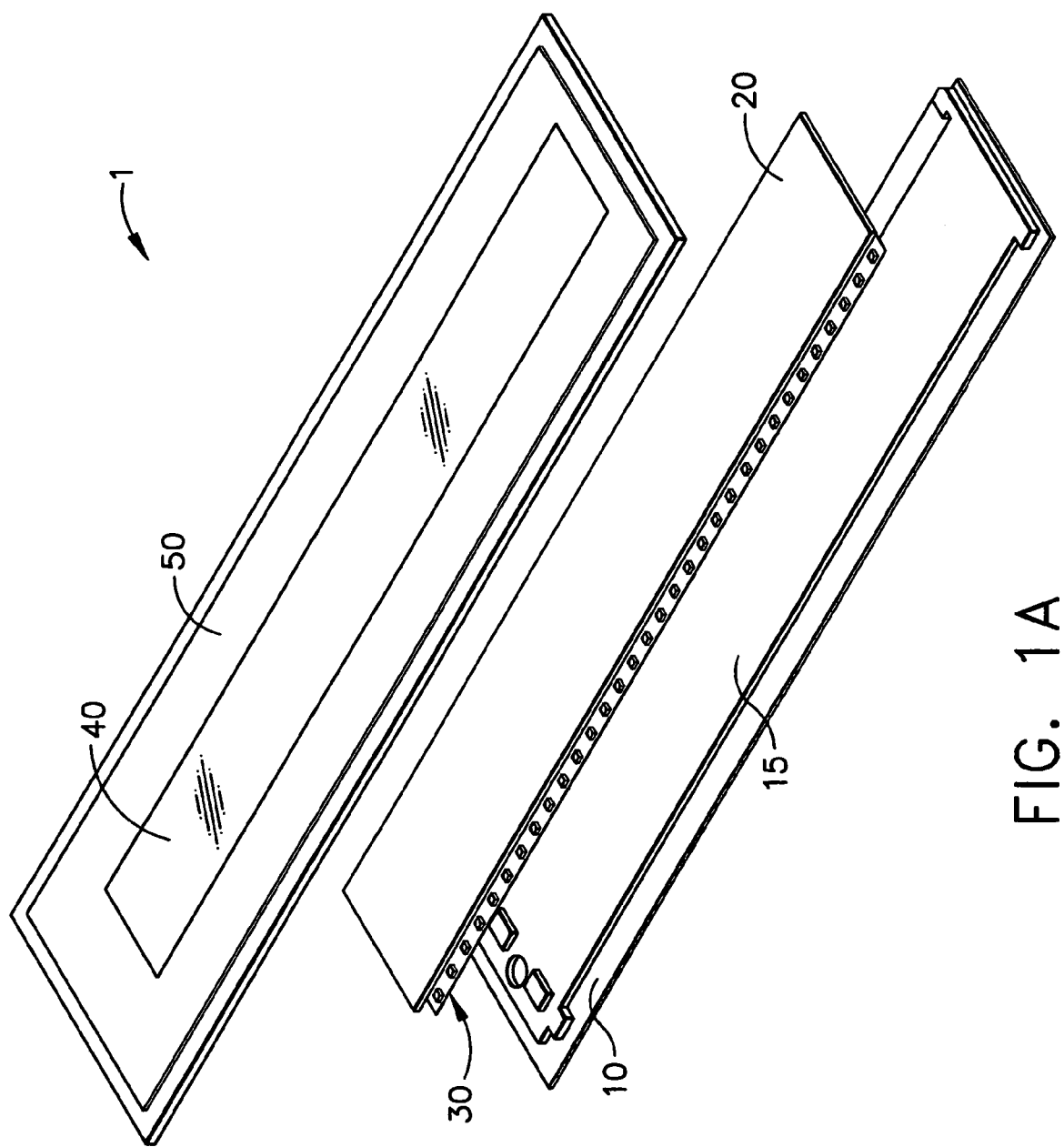
FIG. 1A illustrates an exploded view of the various components of the lighting device, according to an exemplary embodiment of the present invention.

FIG. 1A illustrates various components in a lighting device according to an exemplary embodiment of the present invention. In FIG. 1A, the lighting device 1 includes a base 10 having a reflective layer or surface 15. A light guide 20 is applied over, or in front of, the base 10. A series of surface-mounted diode light sources 30 are located in relation with the light guide 20 in order to emit light in a direction incident to the peripheral edge of the light guide 20. (This may be referred to as "injecting" light into the edges of the light guide 20).

Although only one set of surface-mounted diode light sources 30 are shown, exemplary embodiment of the present invention may include two sets of diode light sources 30, each configured to inject light into a length-wise edge of the light guide 20. In another exemplary embodiment, additional sets of surface-mounted light diode sources 30 may be included, so as to inject light into either three or four of the edges of the light guide 20. Thus, light may be injected into both length- and width-wise edges of the light guide 20.

Referring to FIG. 1A, a diffuse transmissive layer 40 is placed in front of the front surface of the light guide 20. This diffuse transmissive layer 40 may be configured as a lens or window, which is housed by an opaque housing 50. In another embodiment, a diffuse transmissive layer may comprise a sheet placed between the light guide and the outer lens.

It should be noted that the various components of the lighting device 1 will be described using direction-specific terms including "front" and "rear." Use of such terms is not meant to limit the lighting device for use in a specific direction. For purposes of description, terms such as "in front of" are used interchangeably with terms such as "above" or "over." Likewise, terms such as "behind" are used interchangeably with words like "under" or "beneath." As such, for purposes of description, the base 10 will be described as being at the "bottom" or "rear" at the lighting device 1, while subsequent components are described as being in front of, or over, the base 10.

Figure 1B:
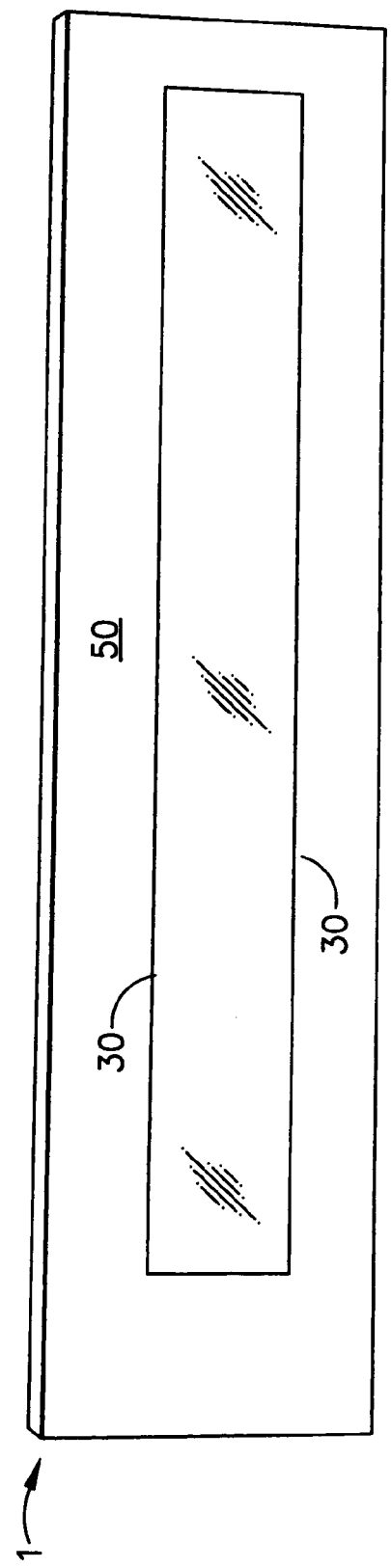
FIG. 1B illustrates various components of the lighting device assembled for operation, according to an exemplary embodiment of the present invention.

FIG. 1B illustrates an exemplary embodiment where the various components of the lighting device 1 are assembled and ready for operation. The particular embodiments illustrated in FIGS. 1A and 1B are particularly suitable for an application where the lighting device 1 is used as a formation light to be mounted on the exterior of an aircraft.

A more detailed description of the various components illustrated in FIG. 1A is provided below.

Base 10 may have a reflective surface or layer 15. For example, the base 10 may be formed of a material whose surface is reflective. Alternatively, the base 10 may be covered, at least partially, by an external coating 15, which exhibits reflective properties.

Thus, light emitted from the set(s) of diode-light sources 30 toward base 10 may be reflected into a visible direction (i.e., toward the front of the device 1).

Each set of surface-mounted diode light sources 30 may be comprised of light emitting diodes (LEDs), infrared (IR) diodes, or a combination of both. In an exemplary embodiment, a set of diode light sources 30 along one of the edges of the light guide 20 may be comprised of LEDs, while a set of diode light sources 30 along another edge of the light guide 20 is comprised of IR diodes. Alternatively, both IR diodes and LEDs may be affixed to a particular set of surface-mounted diodes 30.

In an exemplary embodiment where both LEDs and IR diodes are used, the lighting device 1 may be configured to operate according to dual modes. The lighting device 1 may be used as an aircraft formation light having both a visible mode and covert mode of operation. Thus, only the LEDs will illuminate in visible mode, and only the IR diodes will be turned on in covert mode. The ability of a formation light to operate in a covert mode may be advantageous for military aircraft during nighttime applications to avoid detection by, e.g., enemy forces.

Figure 2C:
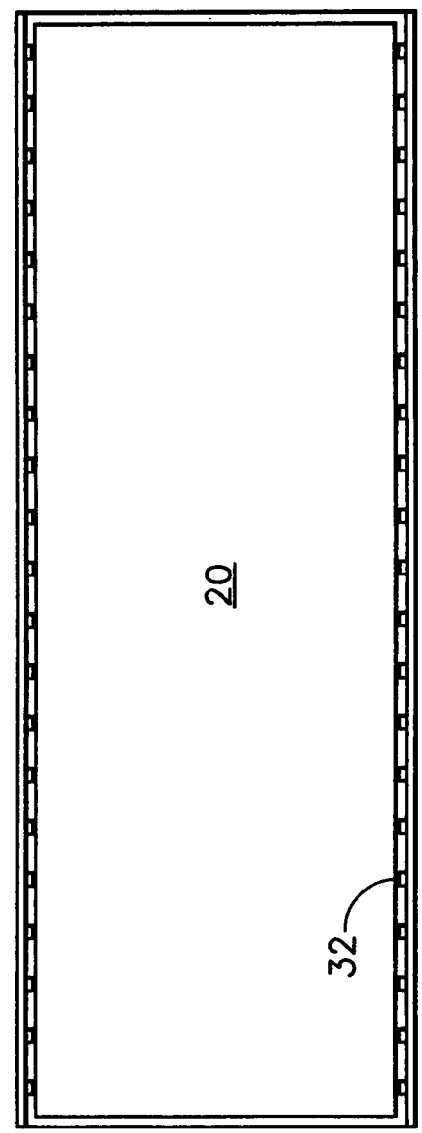
FIG. 2C illustrates the light guide and surface-mounted diode light sources assembled in operative mode, according to an exemplary embodiment of the present invention.
Figure 2A:
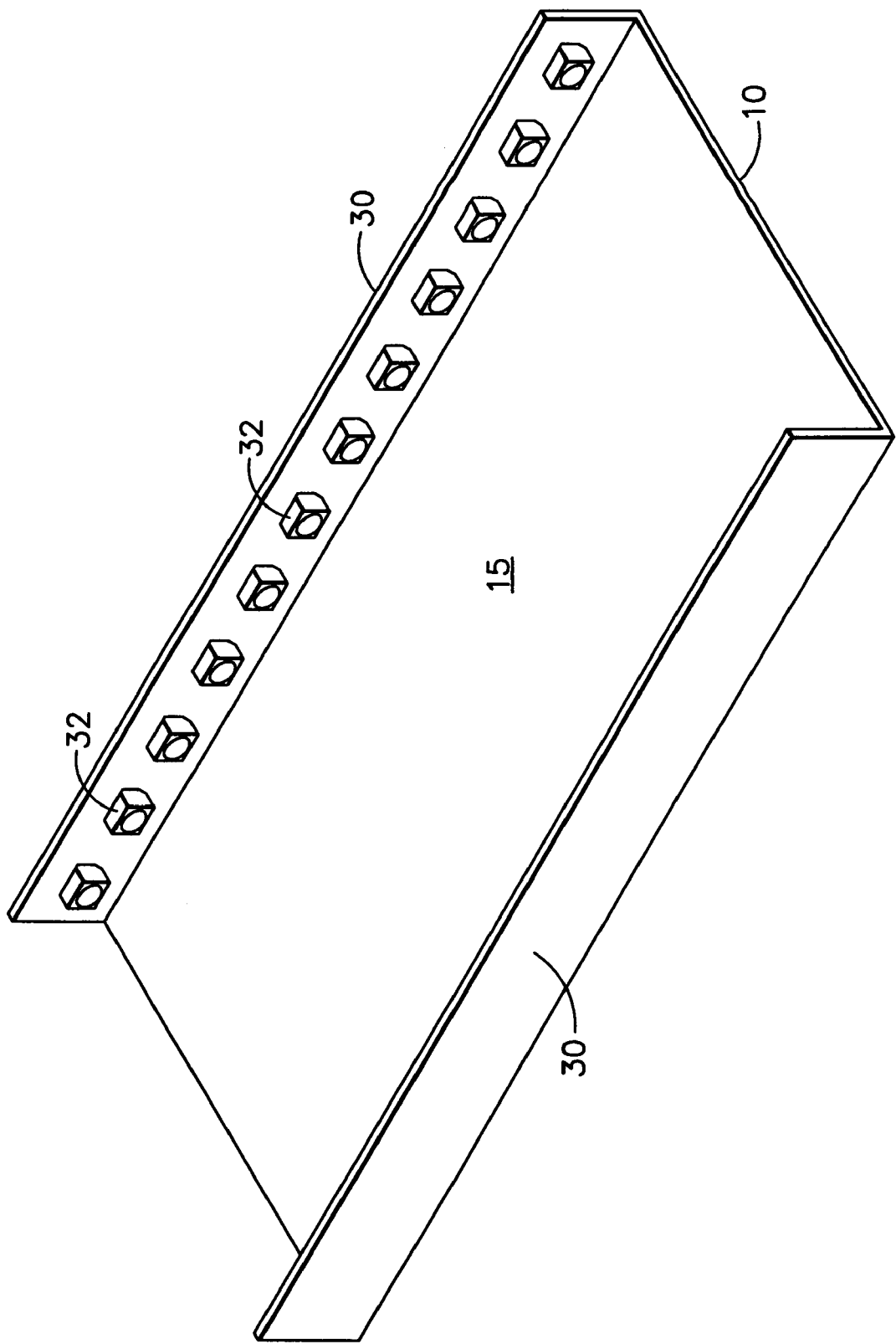
FIG. 2A illustrates the base, reflective layer, and surface-mounted diode light sources of a lighting device, according to an exemplary embodiment of the present invention.

FIG. 2A illustrates the configuration of sets of surface-mounted diode light sources 30 in relation with the base 10. In FIG. 2A, each set of diode light sources 30 is comprised of individual diode light sources 32 (e.g., LED or IR diodes) that are mounted or affixed to a surface substantially perpendicular to the base 10. It should be noted that each set of diode light sources may be also mounted on the base 10 if side-emitting diode light sources are used. It should be noted that the configuration shown in FIG. 2A may be modified by including additional sets of diode light sources 30 at the edges running along the width of device 1.

The reflective layer 15 in FIG. 2A is operable to reflect light emitted from each diode light source 32 upward, i.e., toward the diffuse transmissive layer 40 shown in FIG. 1A. Since the lighting device 1 is configured to output light in this direction, the reflective layer 15 provides the advantage of increasing the amount of viewable light emitted by the device 1.

It should be noted that FIG. 2A is provided for the purpose of illustration, and thus, does not limit the present invention. Various modifications to this configuration may be made without departing from the spirit and scope of the invention. For example, instead of using sets of surface-mounted diode light sources 30, it may be possible to configure the diode light sources 32 to be mounted directly on the base 10. For example, side-emitting diodes may be used as light sources 32 (as described above), or the diode light sources 32 may be mounted to emit in an upward direction. Alternatively, each diode light source 32 may be mounted on a separate surface, rather than all diode light sources 32 being mounted on the same surface along each edge. Furthermore, the shape and dimensions of the base 10 and sets of surface-mounted diode light sources 30 may be modified to suit different types of applications, as will be contemplated by those of ordinary skill in the art.

Figure 2B:
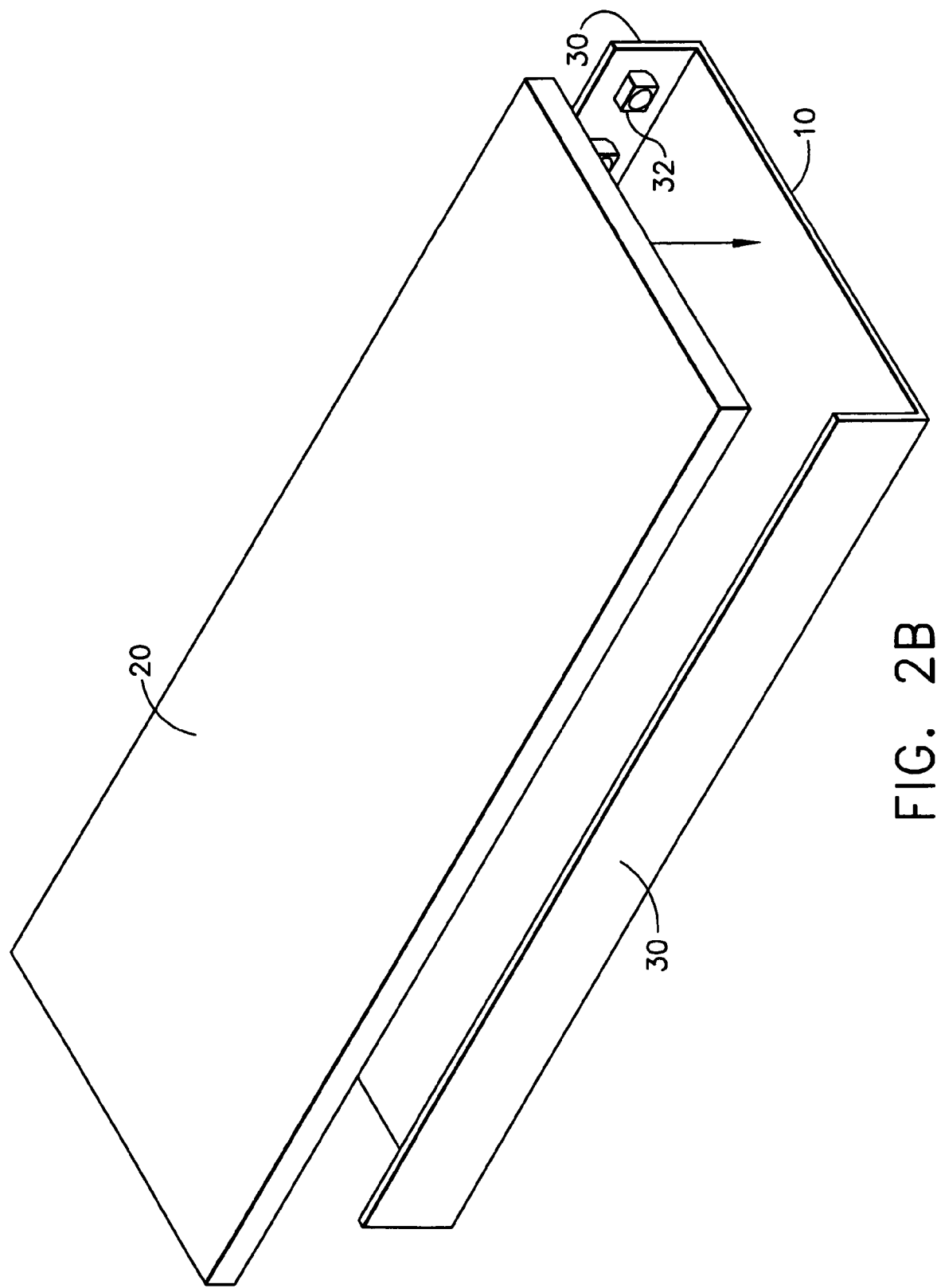
FIG. 2B illustrates the light guide in relation to the base and surface-mounted diode light sources of a lighting device, according to an exemplary embodiment of the present invention.

Referring to FIG. 1A, the light guide 20 is placed in front of the reflective surface 15 of the base 10 so that the peripheral edges of the light guide 20 may receive light emitted from the sets of surface-mounted diode light sources 30. FIG. 2B illustrates the placement of the light guide 20 in relation to each set of diode light sources 30 and the base 10.

According to an exemplary embodiment, the sets of surface-mounted diode light sources 30 are placed in relation to the light guide 20 so that each diode light source 32 emits light in a direction incident to a peripheral edge of the light guide 20.

According to an exemplary embodiment, the light guide 20 may include a set of diffusing elements, or disruptors, on the rear surface (i.e., the surface adjacent to the base 10). These diffusing elements are illustrated as elements 22 in FIG. 3A.

In an exemplary embodiment, the light guide 20 may be comprised of an acrylic material. In such an embodiment, the diffusing elements 22 may be laser etched directly to the rear surface of the light guide 20. In an alternative embodiment, the diffusing elements 22 may be applied to an external layer or coding on the rear surface of the light guide 20, for example, painted or printed on the rear surface.

According to an exemplary embodiment, the diffusing elements 22 are distributed over the rear surface of the light guide 20 according to a pattern or configuration designed to achieve a particular viewable characteristic. In this embodiment, the diffusing elements 22 are operable to scatter at least a portion of the light emitted by diode light sources 32 into the light guide 20. The particular configuration of the plurality of diffusing elements 22, including the size, shape, and relative spacing between diffusing elements 22, may dramatically affect the distribution of light emitted out of the lighting device 1 (through the transmissive diffuse window 40 and any outer lens). Thus, by altering one or more of these configurable attributes (size, shape, spacing, etc.) in the pattern of diffusing elements 22 of light guide 20, illumination properties of the lighting device 1 may be improved.

For instance, altering the configuration of diffusing elements 22 on the rear surface of the light guide 20 may improve the uniformity of light along the length of the front surface of the light guide 20. As a result, the perceived brightness of the light emanating from light guide 20 (and, thus, output from the lighting device 1) may be substantially uniform along the length of the lighting device 1.

Furthermore, the configuration of diffusing elements 22 on the light guide 20 may be designed to improve the perceived uniformity of brightness when the lighting device 1 is viewed from different directions. In other words, the diffusing element 22 may allow the perceived brightness of lighting device 1 to remain relatively constant as the point of view changes. As such, the brightness will seem about the same when the device 1 is viewed from an angle as when it is viewed from directly in front.

Figure 3A:
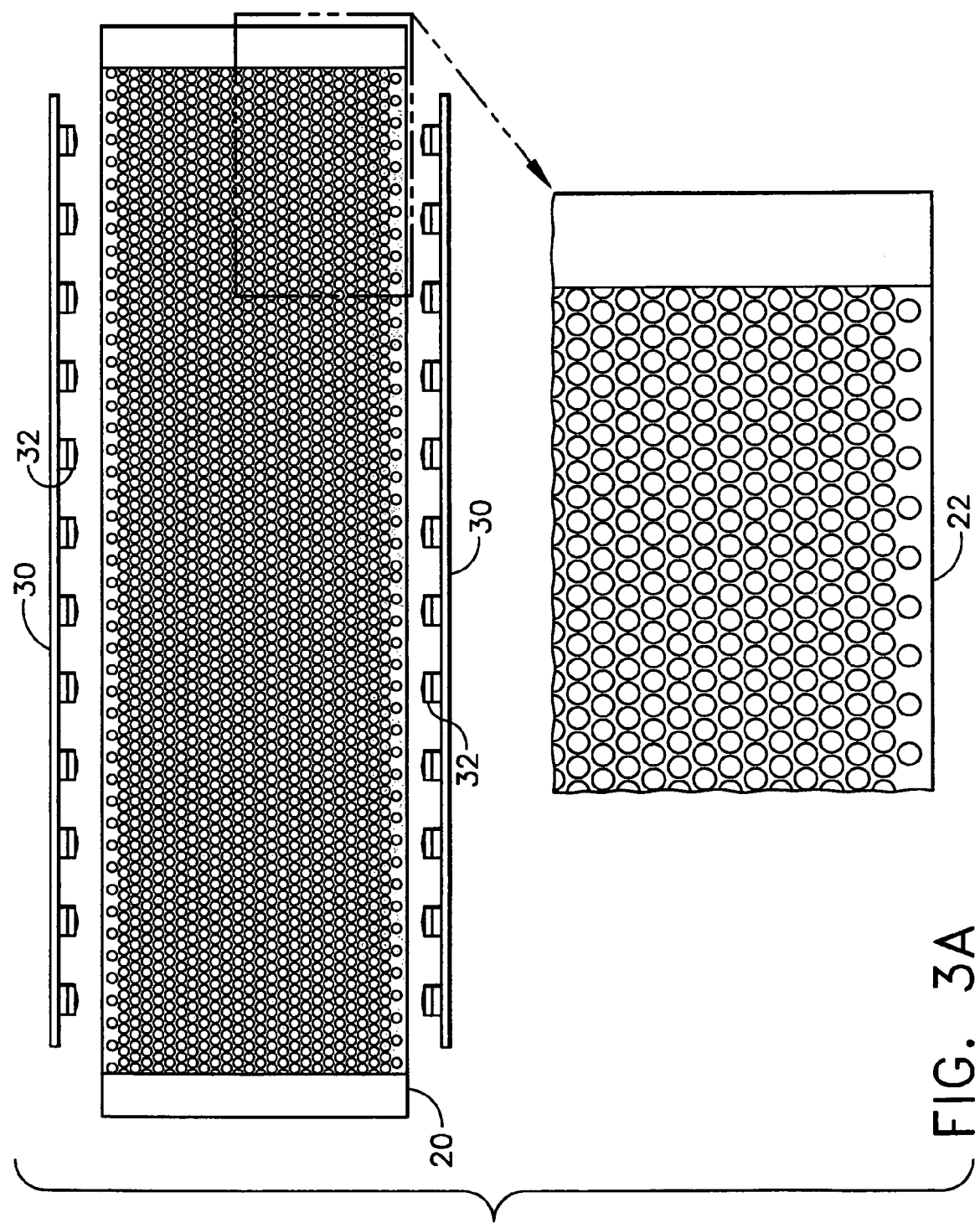
FIG. 3A illustrates a pattern of diffusing elements on the light guide, according to an exemplary embodiment of the present invention.

FIG. 3A illustrates a particular configuration of diffusing elements 22 etched on the rear surface of a light guide 20. In particular, FIG. 3A shows an enlarged view of a portion of the light guide 20 to better illustrate the pattern of diffusing elements 22.

The diffusing elements 22 shown in FIG. 3A comprise laser etchings on the rear surface of the light guide 20. As illustrated, the shape of each diffusing element 22 is circular, such that the configuration resembles a pattern of dots on the light guide 20. As can be readily seen in FIG. 3A, the relative size and spacing of the diffusing elements 22 need not remain constant along the entire length and width of the light guide 20. For example, to improve the visual characteristics of the output light, the size of diffusing elements 22, and the relative spacing between diffusing elements 22 along the edges of the light guide 20 may differ from the diffusing elements 22 closer to the center. Also, the shape of the diffusing elements 22 may change in order to improve visual characteristics.

Figure 3B:
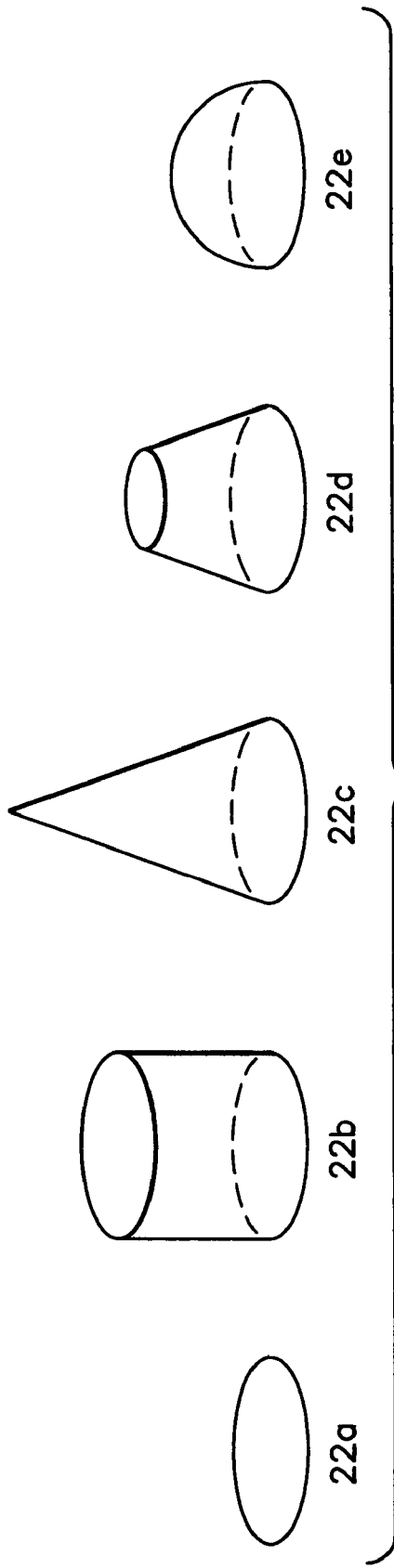
FIGS. 3B and 3C illustrate examples of different shapes for diffusing elements that may be incorporated in a light guide, according to exemplary embodiment of the present invention.
Figure 3C:
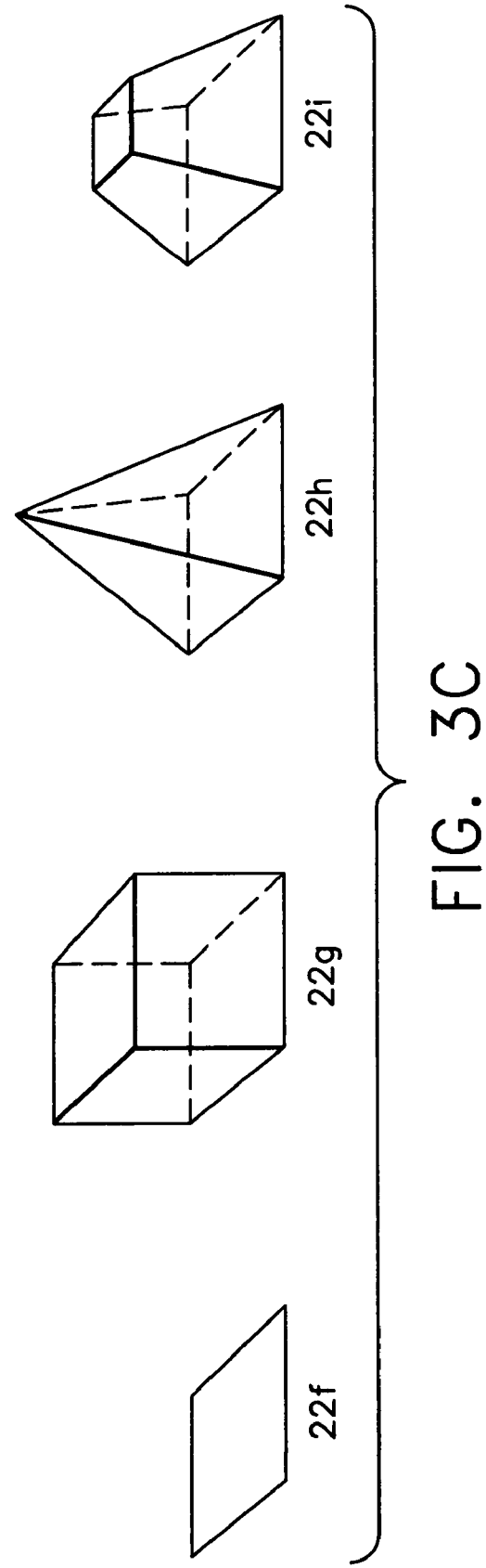

FIGS. 3B and 3C illustrate examples of the types of shapes that the diffusing elements 22 may take. FIGS. 3B and 3C are merely illustrative of the types of available shapes, and do not in any way limit the diffusing elements 22 to these particular shapes. For example, shapes 22A and 22F are examples of two-dimensional diffusing elements 22 that may be painted or printed on the rear surface of the light guide 20. On the other hand, shapes 22B-22E and 22G-22I illustrate examples of three-dimensional shapes that can be etched into the rear surface in order to generate the diffusing elements 22.

It should be noted that the various three-dimensional shapes 22B-22E and 22G-22I illustrated FIGS. 3B and 3C contain exaggerated depths in order to more clearly illustrate the types of shapes that can be used. According to an exemplary embodiment, the etched depth of a diffusing element 22 may be very small relative to the diffusing element's 22 surface dimensions, such as length, width, radius, etc.

Although the diffusing elements 22 have been described above as being laser-etched or painted onto the rear surface of the light guide 20, it will be readily apparent to those of ordinary skill in the art that other methods may be used to apply the diffusing elements 22. For example, the diffusing elements may be chemically etched into the light guide 20. Furthermore, although the light guide 20 has been described as being composed of an acrylic material, other various materials having suitable optical properties may be used, as will be contemplated by those of ordinary skill in the art.

According to an exemplary embodiment, the size, shape, and relative spacing of the diffusing elements 22 may be determined using a computer simulation. Such computer simulations may take into account factors including the type and thickness of material used for the light guide 20, as well as the positioning and properties of diode light sources 32. Based on these factors, the simulation may determine certain characteristics of the light emanating from the light guide 20 as a function of the shape, size, relative spacing, etc. of the diffusing elements 22. Such simulations may be implemented by any known combination of computer-based hardware and software, as will be readily apparent to those of ordinary skill in the art.

For example, such computer-based simulation may allow designers to perform trial-and-error on different configurations of diffusing elements 22, in order to determine a configuration that provides desired visual characteristics, such as uniformity along the length of the lighting device 1 and uniformity from different viewing angles.

However, other methods utilizing trial-and-error and/or calculations may be used to determine the configuration of diffusing elements 22 without the use of computer simulations, as will be readily contemplated by those of ordinary skill in the art.

Referring again to FIG. 1A, a diffuse transmissive layer 40 may be placed in front of the light guide 20 in order to further improve the perceived uniformity of the output light, according to an exemplary embodiment. Various types of diffuse transmissive materials, as will be readily apparent to those of ordinary skill in the art, may be implemented as the diffused transmissive layer 40.

A function of the diffused transmissive layer 40 is to ensure that the pattern or configuration of the diffusing elements 22 of the light guide 20 is not directly visible when the lighting device 1 is operational. Accordingly, the design and configuration of the diffuse transmissive layer 40 may be dependent upon the configuration of the diffusing elements 22 arranged on the rear surface of the light guide 20. Various methods are well known in the art for configuring a diffuse transmissive layer 40 based on the pattern of diffusing elements 22 to increase the uniformity of visible light, thereby preventing the pattern of diffusing elements 22 from being visible.

However, it may not be critical to prevent the pattern of diffusing elements 22 from being visible at the output of lighting device 1. In such applications, the diffused transmissive layer 40 may be omitted.

According to an exemplary embodiment, the diffuse transmissive layer 40 may be incorporated into an outer lens, which is secured onto the lighting device 1 by the opaque housing 50. For example, the outer lens may be formed of a diffuse transmissive material. In an alternative embodiment, the diffuse transmissive layer 40 may be implemented behind a clear outer lens.

Figure 4A:
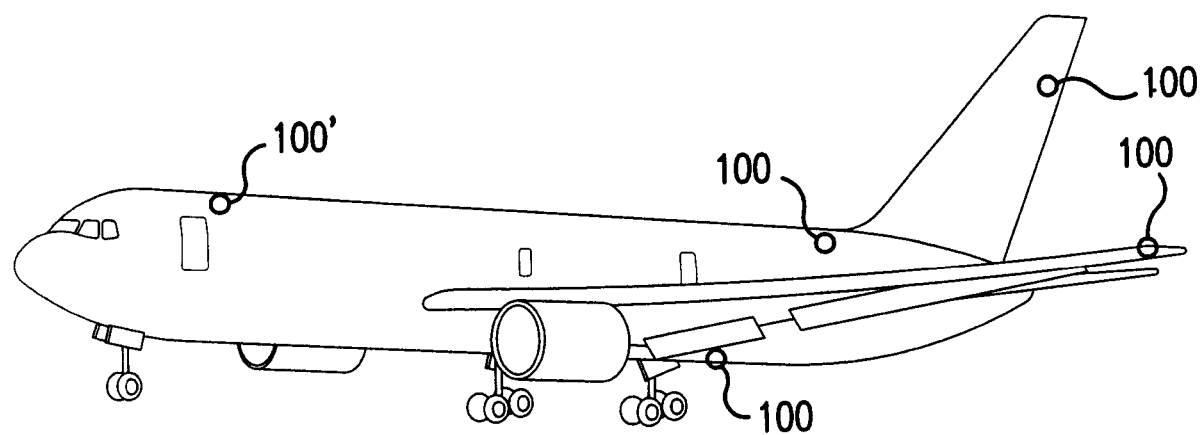
Figure 4B:
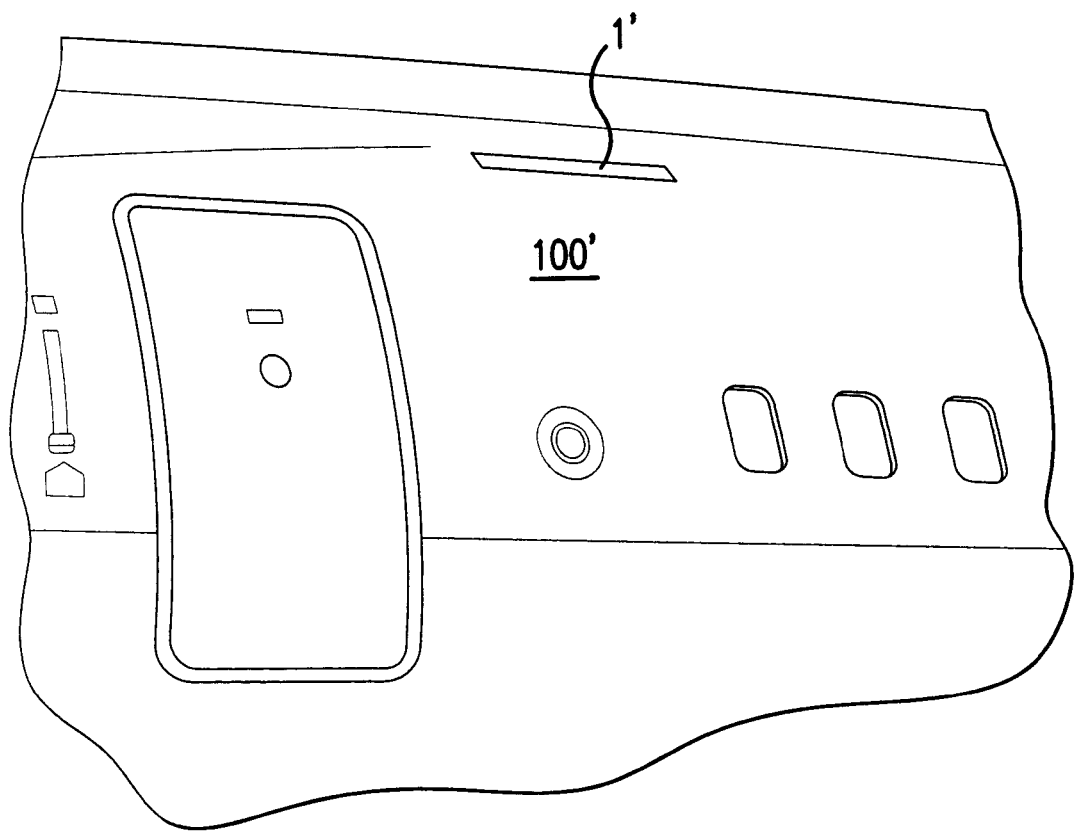
FIG. 4B illustrates a lighting device mounted as an aircraft formation light, according to an exemplary embodiment of the present invention.

According to an exemplary embodiment, the lighting device 1 may be implemented as an aircraft formation lighting device. FIG. 4A illustrates various locations 100 on an aircraft on which the aircraft formation light may be mounted. In such applications, various constraints may be placed on the thickness of the lighting device 1, when assembled as shown in FIG. 1B. In a particular exemplary embodiment, the accumulative thickness of the diffused transmissive layer 40, light guide 20, and reflective base 10 may be limited. For example, this thickness may be substantially equal to, or less than, ½ of an inch. FIG. 4B illustrates an example of an aircraft formation light 1' constructed according to principles of the present invention and mounted at a location 100' on the aircraft's fuselage.

Furthermore, an aircraft formation lighting device 1, in accordance with exemplary embodiments of the present invention, may operate in dual modes—visible and covert. As discussed above, the formation lighting device 1 may be configured to emit infrared (IR) light in covert mode, so that the formation light is visible only through the use of Night Visual Goggle (NVG) technology. For example, a set of military aircraft flying in formation during a covert operation may utilize formation lighting devices 1 in covert (IR) mode so as not to be visible to enemy aircraft or ground forces.

It should be noted, however, that the lighting device 1 is not limited to only two modes. For example, the lighting device 1 may be configured to operate in either a covert (IR) mode, or one of a plurality of visible modes. In such an embodiment, each visible mode may correspond to a different color illuminated by the lighting device 1. For example, if the sets of diode light sources 30 include red and green light emitting diodes 32, the lighting device 1 may include different modes corresponding to red and green light.

What is claimed:

1. An aircraft formation light utilizing a diode light source, comprising:
   a reflective base;
   a light guide configured in front of the reflective base, the light guide including a plurality of diffusing elements; and
   one or more diode light sources each configured to emit light in a direction incident to a peripheral edge of the light guide,
   wherein
      the one or more diode light sources are the primary source of light emanating from the lighting device,
      the diffusing elements are configured to scatter the emitted light in a plurality of directions out of a front surface of the light guide to increase a uniformity of light along the light guide, and
      the aircraft formation light is mounted to the exterior of an aircraft during operation to emit light indicative of the aircraft's position and attitude, the aircraft formation light being mounted such that the formation light protrudes no more than ½ inch from the exterior surface of the aircraft.

2. The aircraft formation light of claim 1, wherein the diffusing elements are distributed on a rear surface of the light guide.

3. The aircraft formation light of claim 2, wherein the configuration of the diffusing elements scatters the emitted light in a manner increasing uniformity of a perceived brightness of the scattered light as viewed from the plurality of directions.

4. The aircraft formation light of claim 2, wherein the configuration of the diffusing elements scatters the emitted light in a manner increasing uniformity of a perceived brightness of the scattered light along the length of the front surface.

5. The aircraft formation light of claim 2, wherein at least one of size and relative spacing of the diffusing elements does not remain constant along a particular dimension of the light guide.

6. The aircraft formation light of claim 2, wherein the diffusing elements comprise etchings on the rear surface of the light guide.

7. The aircraft formation light of claim 6, wherein the light guide is made of a transparent plastic material.

8. The aircraft formation light of claim 6, wherein the diffusing elements are laser etched on the rear surface of the light guide.

9. The aircraft formation light of claim 2, wherein the diffusing elements are applied on the rear surface of the light guide by at least one of painting and printing.

10. The aircraft formation light of claim 1, wherein the diode light sources include at least two diode light sources each configured to emit light at substantially different wavelengths.

11. The aircraft formation light of claim 1, wherein the diode light sources include at least two diode light sources each configured to emit light at substantially the same wavelength.

12. The aircraft formation light of claim 1, further comprising:
    a diffuse transmissive layer configured in front of the light guide to redirect the scattered light passing out of the front surface of the light guide.

13. The aircraft formation light of claim 12, wherein the diffuse transmissive layer is configured, based on the configuration of the diffusing elements, to redirect the scattered light to improve uniformity of a perceived brightness.

14. The aircraft formation light of claim 12, further comprising:
an outer lens, the diffuse transmissive layer being implemented as part of the outer lens.

15. The device of claim 1, wherein the reflective base includes a reflective layer adjacent to the diffusing elements of the light guide, the reflective layer being configured to reflect light scattered by the diffusing elements out of the front surface of the light guide.

16. An aircraft formation light utilizing a diode light source, comprising:
a reflective base;
a light guide configured in front of the reflective base, the light guide including a plurality of diffusing elements; and
one or more diode light sources each configured to emit light in a direction incident to a peripheral edge of the light guide,
wherein the diffusing elements are configured to scatter the emitted light in a plurality of directions out of a front surface of the light guide,
wherein the diode light sources include one or more infrared (IR) diodes configured to emit infrared light, and
wherein the aircraft formation light is mounted to the exterior of an aircraft during operation to emit infrared light indicative of the aircraft's position and attitude, the aircraft formation light being mounted such that the formation light protrudes no more than ½ inch from the exterior surface of the aircraft.

17. The aircraft formation light of claim 16, wherein
the diode light sources further include one or more LEDs configured to emit visible light, and
the LEDs are operable to emit light according to a first mode of operation and the IR diodes are operable to emit infrared light according to a second mode of operation.

18. A method comprising:
mounting a device including one or more diode light sources and a light guide on the exterior of an aircraft at a mounting location for a formation light, the mounted device protruding no more than ½ inch from the exterior surface of the aircraft;
emitting light from the one or more diode light sources in a direction incident to a peripheral edge of the light guide;
scattering the emitted light with diffusing elements in the light guide, the diffusing elements being configured to scatter the emitted light out of the light guide in a plurality of directions to increase a uniformity of light along the light guide; and
reflecting light that is scattered out of the light guide through a rear surface, so that the reflected light exits a front surface of the light guide; and
outputting a formation light from the device indicative of the position and attitude of the aircraft, the formation light being formed by the scattering and reflecting steps,
wherein the one or more diode light sources are the primary source of light for the formation light outputted from the device.

19. The method of claim 18, wherein the scattering step uses diffusing elements etched on a rear surface of the light guide to scatter the emitted light, the light guide being made of a transparent plastic material.

20. The method of claim 18, wherein the scattering step uses diffusing elements that are painted on a rear surface of the light guide, the diffusing elements being distributed over the rear surface of the light guide.

21. The method of claim 18, further comprising:
redirecting the scattered light with a diffuse transmissive layer in front of the front surface of the light guide, wherein the redirecting step improves a uniformity of a perceived brightness.

22. The method of claim 18, further comprising:
designing a configuration for the diffusing elements in order to achieve a perceived characteristic of the formation light; and
distributing the diffusing elements on the rear surface of the light guide according to a configuration designed to achieve a perceived characteristic.

23. The method of claim 22, wherein the configuration is designed to achieve uniformity of a perceived brightness of the scattered light among the plurality of directions.

24. The method of claim 22, wherein the configuration is designed to achieve uniformity of a perceived brightness of the scattered light along at least one of a length and width of the front surface.

25. The method of claim 18, the determining a configuration of the diffusing elements including performing a computer simulation.

26. The method of claim 18, the diode light sources including one or more light emitting diodes (LEDs) and one or more infrared (IR) diodes, the method further comprising:
emitting light from the LEDs in response to a first mode being chosen; and
emitting infrared light from the IR diodes in response to a second mode being chosen.

* * * * *